United States Patent [19]

Rolph

[11] 3,771,243
[45] Nov. 13, 1973

[54] DISPLAY DEVICE
[76] Inventor: Edwin J. Rolph, 2931 W. Pierson, Phoenix, Ariz. 85017
[22] Filed: Mar. 31, 1972
[21] Appl. No.: 239,946

[52] U.S. Cl............................................. 40/129 C
[51] Int. Cl............................................... G09f 7/00
[58] Field of Search................. 40/129 C, 159, 10 A, 40/16

[56] References Cited
UNITED STATES PATENTS
| | | | |
|---|---|---|---|
| 1,467,680 | 9/1923 | Oda | 40/159 |
| 2,093,598 | 9/1937 | Clark | 40/10 A |
| 2,886,907 | 5/1959 | Stephenson | 40/158 R |
| 3,241,857 | 3/1966 | Goetz | 40/129 C |
| 3,698,111 | 10/1972 | Smith | 40/142 A |

Primary Examiner—Robert W. Michell
Assistant Examiner—Wenceslao J. Contreras
Attorney—Herbert E. Haynes, Jr.

[57] ABSTRACT

An enclosing structure particularly suitable for attachment to an automotive vehicle for containing and displaying printed material is provided with a transparent flexible panel which is fixedly secured on a portion of its perimeter to a supporting frame structure with the remainder of the perimeter providing a removably securable flap to facilitate interchanging of the material.

2 Claims, 4 Drawing Figures

PATENTED NOV 13 1973 3,771,243
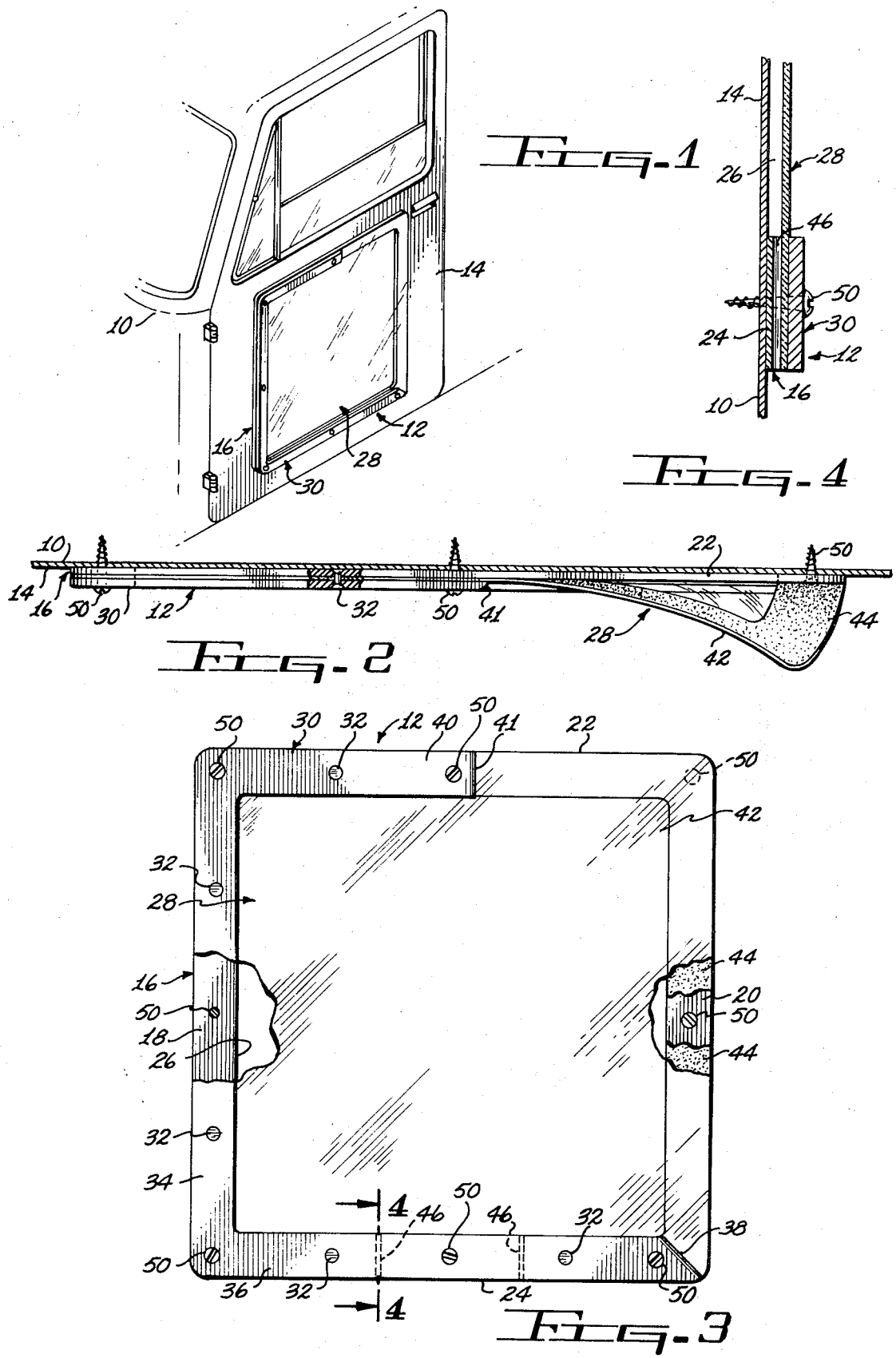

DISPLAY DEVICE

BACKGROUND OF THE INVENTION

1. Field of the Invention

This invention relates to display devices and more particularly to a vehicular mounted display device for interchangeably containing and displaying printed material.

2. Brief Description of the Prior Art

It is a common pratice to display printed material on an automotive vehicle. Such material may take the form of advertisements, vehicular identifying signs and the like.

To illustrate some of the problems related to this practice, the following example is given.

The Interstate Commerce Commission (I.C.C.) controls the transporting of cargo and will issue a license to a trucking firm which authorizes that firm to transport a particular type of cargo. The I.C.C. requires that a cargo transporting vehicle be identified with the name and license number under whose authorization its cargo is being transported.

It is not economically feasible for a vehicle to transport a cargo to a destination and return empty due to the lack of authorization to transport an available cargo. Therefore, a vehicle will often transport a cargo to its destination under the authorization granted to one licensee and return to its point of origin carrying a cargo under the authorization granted to a different licensee. This type of operation is sometimes referred to in the trade as trip-leasing.

In cases where a vehicle is employed for exclusive operation under the authorization granted to a single licensee, identification of the vehicle presents no problem as the indicia is simply painted on the vehicle.

However, many trucking firms exist which employ the trip-leasing type of operation and it is not practical to repaint the indicia displaying portions of the vehicle each time the need arises to change its identification.

Therefore, in view of the above, and other circumstances which require or make it desirable to interchangeably display printed material on an automotive vehicle, several devices and methods for this purpose have been devised.

One such method is to use masking tape or the like around the periphery of the sign. This is not only unsightly but the tape must be replaced after each use and will sometimes peel the paint off the vehicle when the sign must be removed. Also, this method exposes the sign to the elements which oftentimes results in its destruction by wind damage, rain, and the like.

Another method sometimes employed is that of a plastic sign which is removably secured to the vehicle by magnetic tape. The magnetic tape is also capable of peeling the paint, and this type of attachment does not protect the sign from the elements.

Other less commonly used methods are employed, but they all have the problems discussed above in varying degrees.

In view of the above, a need exists for a vehicular mounted display device for interchangeably containing and displaying printed material which eliminates some of the problems associated with the prior art displaying devices and methods.

SUMMARY OF THE INVENTION

In accordance with the invention a display device for fixed attachment to an automotive vehicle is disclosed which is suitable for containing and displaying printed material. The display device includes a flexible transparent panel which is provided with a removably securable flap portion that facilitates interchanging of the printed material. The device may also include means for draining moisture which may form in the interior of the device due to condensation, leakage, and the like.

Accordingly, it is an object of the present invention to provide a new and useful display device for printed material.

Another object of the present invention is to provide a new and useful display device for printed material which is particularly suitable for attachment to an automotive vehicle.

Another object of the present invention is to provide a new and useful display device for fixed attachment to an automotive vehicle, said device adapted to completely contain printed material.

Yet another object of the present invention is to provide a new and useful display device for fixed attachment to an automotive vehicle, said device adapted to interchangeably contain and display the printed material.

Still another object of the present invention is to provide a new and useful display device for printed material of the character described which is provided with means for draining moisture from the interior thereof.

The foregoing and other objects of this invention, as well as the invention itself, may be more fully understood when read in conjunction with the following drawing.

BRIEF DESCRIPTION OF THE DRAWING

FIG. 1 is a fragmentary perspective view of an automotive vehicle with the display device of the present invention attached thereto;

FIG. 2 is an enlarged top view partially broken away and illustrating the various features of the present invention.

FIG. 3 is a front elevation, partially broken away, and illustrating the display device of the invention.

FIG. 4 is an enlarged sectional view taken on the line 4—4 of FIG. 3.

DESCRIPTION OF THE PREFERRED EMBODIMENT

Referring more particularly to the drawing, FIG. 1 illustrates a fragmentary portion of an automotive vehicle 10 having a display device 12 of the present invention attached thereto.

The display device 12 is shown as mounted on the door 14 of the vehicle 10, however this invention should not be limited to this particular mounting position, for the device could be mounted on any relatively flat surface.

The display device 12 comprises a base frame 16 formed of ferromagnetic material, such as a low grade of iron or other alloys of metal. To prevent rust of the base frame it may be plated such as with cadmium or other suitable materials which would not interfere with the magnetic field. The frame 16 includes a pair of parallel spaced apart side members 18 and 20. The side members 18 and 20 are interconnected at their top and bottom ends by integrally formed top and bottom members 22 and 24. The spaced apart relationship of the members 18, 20, 22, and 24 form a central opening 26 through a base frame 16. It should be noted that the base frame 16 could be fabricated without the central opening 26 by employing a flat sheet of material (not shown).

The display panel 12 further comprises a panel 28 of flexible transparent material, the perimeter configuration and dimension being formed to coincide with the perimeter of the frame 16.

The transparent panel 28 is fixedly secured on a segment of its perimeter to the base frame 16 by a retaining means which may take the form of a partial frame 30 or other suitable means such as epoxy cement. As best seen in FIG. 2, the retaining frame 30, the transparent panel 28, and the base frame 16, are placed in juxtaposed relationship with respect to each other and are assembled into a sandwich like assembly. The sandwich like assembly is fixedly held in this manner by suitable fastening devices such as a plurality of spacedly arranged countersunk flat head rivets 32.

As seen best in FIG. 3, the retaining frame 30 is a substantially C-shaped structure which conforms to a portion of the base frame 16. The retaining frame 30 has a side member 34 which is positioned in juxtaposed relationship to the side member 18 of the base frame 16. An integrally formed laterally extending bottom member 36 is normal to the side member 34 and positioned in juxtaposed relationship to the bottom member 24 of the base frame 16. The bottom member 36 has an angularly disposed terminal end 38 which prevents damage of the panel 28 when it is folded as will hereinafter be described in detail.

An integrally formed laterally extending top member 40 is parallel to the bottom member 36 and is positioned to overlay approximately one-half of the top member 22 of the base frame 16.

It may now be easily seen that the transparent panel 28 is fixedly attached on its bottom edge, one side edge and a portion of its top thus dividing the perimeter of the panel into a fixed segment and a movable segment which thus allows an area of the panel to act as a movable flap 42.

A strip of magnetic tape 44 is secured, such as by a suitable adhaesive to the underside of the movable perimeter of the flap 42. The magnetic tape 44 is positioned on the flap 42 so as to extend from the angular terminal end 38 to the extending end 41 of the retaining frame 30.

The magnetic tape 44 mounted as described to the underside of the flap 42 provides attaching means by which the flap is demountably attachable to the ferromagnetic material of the base frame 16. It may now be seen that by folding the flap 42 as shown in FIG. 2, a sign (not shown) or other printed material may be removably inserted between the panel 28 and the base frame 16 of the device 12.

The combination of the retaining frame 30 and the magnetic tape 44 provides a substantially sealed enclosure for protecting the printed material from the elements. However, moisture may enter into the interior of the device 12 such as by leakage or condensation. To prevent trapping of any moisture within the display device 12, a plurality of drainage channels 46 may be transversely formed in the bottom member 24 of the base frame 16.

Mounting of the display device 12 to an automotive vehicle 10 or other suitable flat surface, may be accomplished by sheet metal screws 50 or other appropriate attaching devices provided at spaced increments around the perimeter of the display device 12.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A display device for removably containing and displaying a sheet of printed material comprising:
   a. a base frame;
   b. a transparent panel of flexible material in juxtaposed relationship to said base frame;
   c. retaining means affixed to said panel for fixedly securing a segment of the perimeter thereof to said base frame so as to divide the perimeter of said panel into a fixed segment and a movable segment, said retaining means comprises a substantially C-shaped frame in juxtaposed relationship to the outwardly facing surface of siad panel, said C-shaped frame fixedly attached to said base frame to secure the fixed segment of the perimeter of said panel therebetween; and
   d. attaching means affixed to the movable segment of the perimeter of said panel for demountably attaching the movable segment of the perimeter of said panel to said base frame so as to provide said panel with a demountable flap area through which the sheet of printed material is removably insertable between said base frame and said panel.

2. A display device for removably containing and displaying a sheet of printed material comprising:
   a. a base frame;
   b. a transparent panel of flexible material in juxtaposed relationship to said base frame;
   c. retaining means affixed to said panel for fixedly securing a segment of the perimeter thereof to said base frame so as to divide the perimeter of said panel into a fixed segment and a movable segment, said retaining means is in juxtaposed relationship to the outwardly facing surface of said panel, said retaining means comprising:
      1. a vertically disposed side member;
      2. a bottom member extending from the lower end of said side member and normal thereto;
      3. a top member extending from the upper end of said side member and parallel to said bottom member, said top member being shorter in length than said bottom member;
      4. a plurality of fastening devices positioned in spaced increments on said side member, on said bottom member and on said top member to assemble said retaining means to said panel and to said base frame; and
   d. attaching means affixed to the movable segment of the perimeter of said panel for demountably attaching the movable segment of the perimeter of said panel to said base frame so as to provide said panel with a demountable flap area through which the sheet of printed material is removably insertable between said base frame and said panel.

* * * * *